United States Patent Office 3,447,650
Patented June 3, 1969

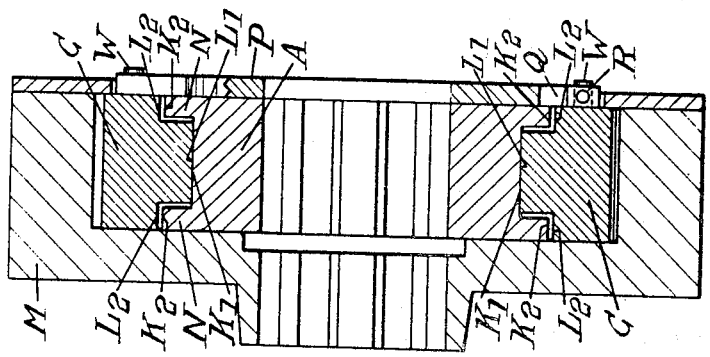
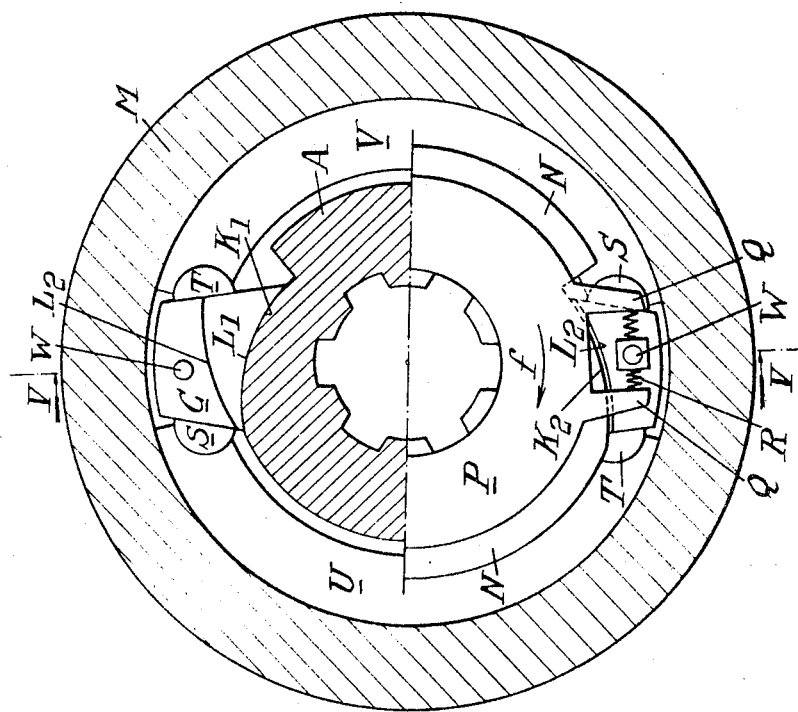

3,447,650
ONE-WAY FRICTION COUPLINGS WITH WEDGES
Michel Dossier, Bois Fleuri, 78 Orgeval, France
Filed Feb. 17, 1967, Ser. No. 616,935
Claims priority, application France, Feb. 23, 1966, 50,783
Int. Cl. F16d *11/06, 13/04, 23/00*
U.S. Cl. 192—41                          11 Claims

ABSTRACT OF THE DISCLOSURE

The free wheel to be interposed between a shaft and a sleeve comprises shoes applied against the periphery of the sleeve by means of wedges cooperating with cam portions of the shaft, all the parts being kept in contact by means of springs.

---

Figure 1:
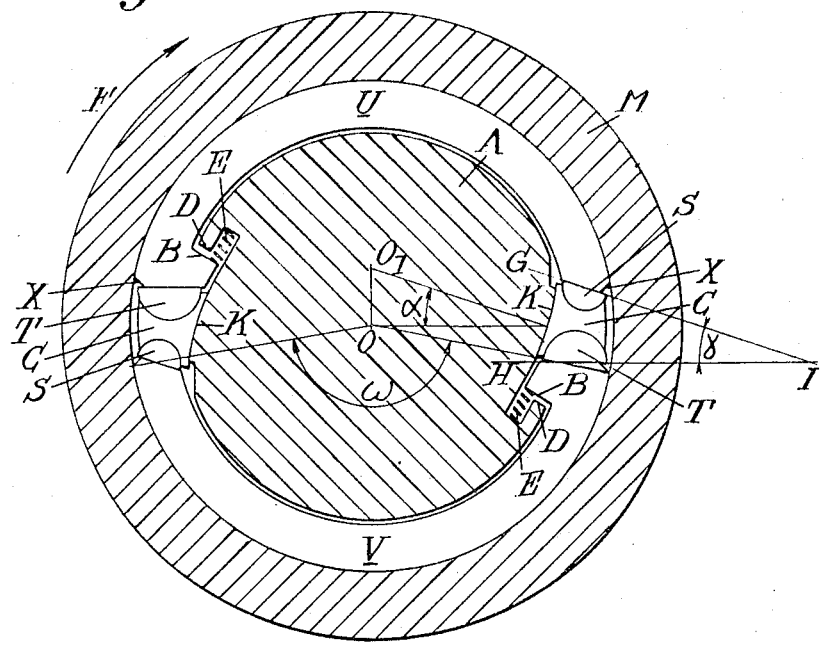

The present invention relates to one-way clutches, such as free wheels, to be interposed between two coaxial parts adapted to rotate about each other in one direction and to prevent any relative rotation in the other direction.

An object of the present invention is to provide a mechanism of this type capable, for a given dimension thereof, of transmitting torques higher than those that could be transmitted through known mechanisms of the same type, owing to a better distribution of the forces even when the pieces to be coupled together are not exactly coaxial.

Another object of this invention is to provide a clutch working without play, i.e. engaged as soon as relative rotation tends to take place between the parts in the forbidden direction.

The clutch according to this invention is constituted by the combination, with a shaft intended to drive in a single direction a sleeve coaxial therewith (or the reverse), of:

On the one hand, at least two transmission elements interposed between the shaft and the sleeve and having circular surfaces in contact with the circular surface of one of the parts to be coupled together (shaft or sleeve) and cooperating with wedges bearing upon cam portions (oblique surfaces) belonging to the other of said parts (sleeve or shaft) in such manner that, when relative rotation tends to take place in the forbidden direction, the combined actions of the cam portions pushing the wedges and of the wedges applying said transmission elements against the first part causes the clutch to be engaged, whereas, in the other direction, the parts are disengaged and can rotate relatively to each other, and On the other hand, springs bearing upon the part that carries the cam portions and adapted constantly to urge said transmission elements in the forbidden direction, thus ensuring, even during free wheel operation, contact between all the parts included in the clutch.

The action of these springs is essential, because it permits clutch engagement to be obtained without lag as soon as relative rotation tends to take place in the forbidden direction.

According to another feature of the present invention, abutments complete the action of said springs in the case of high acceleration in the free wheel direction, these abutments, like the above mentioned springs, being preferably disposed in such manner as to drive the transmission elements by pulling them rather than by pushing them, in order to avoid any risk of wedging during free wheel operation.

According to another feature of the invention, self-orientable shoes, interposed between the wedges and the cam portion surfaces and/or between the wedges and the transmission elements, ensure complete bearing of these pieces against one another, despite angular displacements which may result from resilient deformations or from an imperfect coincidence of the respective axes of the shaft and of the sleeve.

According to still another feature of the invention, when the cam portion surfaces are carried by the sleeve, the force of the above mentioned springs may be adjusted so that, by centrifugal effect, during free wheel operation, any contact with the shaft is prevented beyond a given speed of rotation of the sleeve, such an arrangement being, in particular, advantageous for the particular application of the clutch between a starter and an internal combustion engine.

Figure 2:
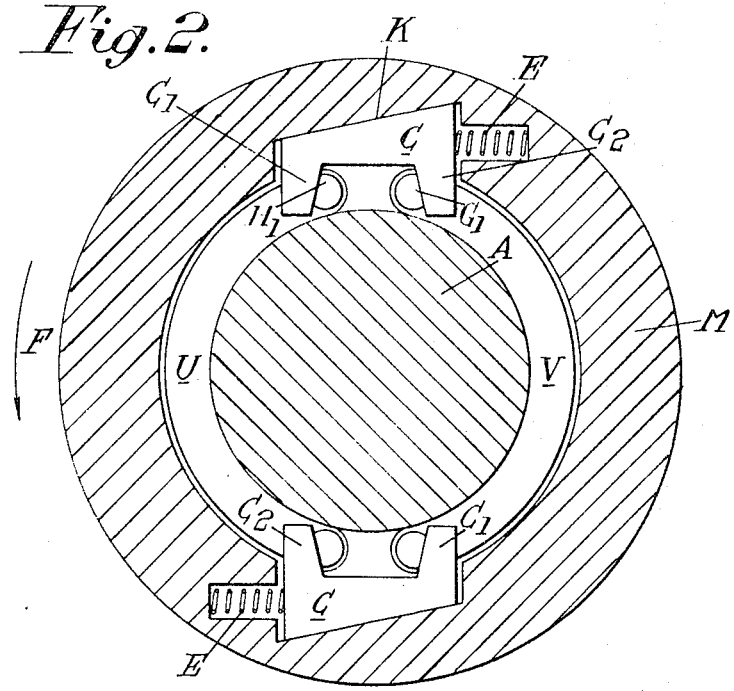
Figure 3:
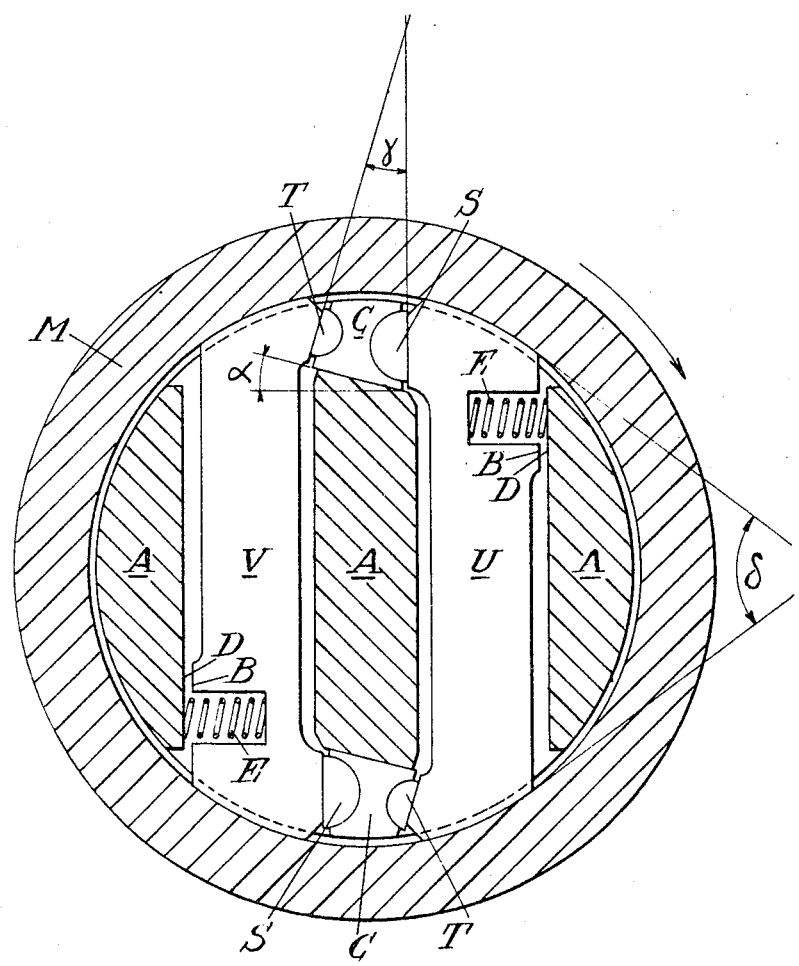

Preferred embodiments of the present invention will be hereinafter described with reference to the appended drawings, given merely by way of example, and in which:

FIG. 1 is a diagrammatic transverse sectional view of a one-way clutch made according to the present invention;

FIGS. 2 and 3 diagrammatically show two other embodiments of the clutch according to the invention;

FIG. 4 shows, in elevational view, with portions in section and cut away, still another embodiment of the present invention; and FIG. 5 is a sectional view on the line V—V of FIG. 4.

According to the embodiment of FIG. 1, between a shaft A and a sleeve M, coaxial with each other axis O, there is provided a one-way clutch ensuring coupling when shaft A tends to rotate in the direction of arrow F with respect to sleeve M, whereas free wheel operation is ensured in the opposed direction by the intermediate of a ring comprising:

On the one hand ring elements U, V in contact with the inner surfaces of sleeve M, which is of revolution about axis O, and On the other hand, wedges C interposed between said ring elements U, V and bearing upon cam portions K of shaft A, these wedges being provided with movable shoes S, T through which said wedges C are applied against the ends of the adjacent ring elements U, V.

When shaft A tends to rotate in the direction of arrow F, cam portions K push wedges C between ring elements U, V through shoes S, T, applying said ring elements U, V against inner surface of sleeve M with a force which is the greater as the obliquity $\alpha$ of the cam portions with respect to the base circle and the angle $\gamma$ of the wedges are both smaller.

There is no sliding under load if the force multiplying factor resulting from the combined effect of the cam portions and of the wedges is such that the limit sliding torque of the ring elements upon the sleeve is greater than the torque that is applied, whatever be the value of this applied torque.

For instance, it can be calculated that, for a friction coefficient of ten per cent angles $\alpha$ and $\gamma$ respectively equal to 10° and 20° comply with this condition.

But in order to obtain transmission without lag, it is necessary that, when relative movement tends to take place in the driving direction, all the pieces are in contact with one another and, according to the invention, this condition is ensured by the provision of springs, such as E, interposed between shaft A and the ring elements U, V said springs exerting a tangential effort that pulls the ring elements and, through them, pushes the wedges in the direction opposed to arrow F.

Besides, abutments such as B and D, belonging respectively to the ring elements and to the shaft, are provided for limiting, if necessary, the amplitude of the backward movement of the intermediate pieces in the free wheel direction in the case of shaft A being subjected in this direction to an acceleration such that the springs would not be sufficient to keep the pieces in position.

According to the invention, these abutments (like the springs) are preferably disposed at the rear end of the ring elements with respect to direction F, that is to say at the forward ends with respect to the direction of free wheel rotation of these ring elements U and V.

When free wheel movement tends to take place, cam portions K no longer bear upon wedges C and the latter loosen their engagement between ring elements U, V, as far as springs E permit this. The residual friction torque during free wheel operation is therefore exactly equal to that of the forces exerted by springs E with respect to axis O.

However, in order to have no wedging resistance opposing this release, angles α and γ must be higher than the friction angle and twice this friction angle, respectively, which is in particular the case with the above indicated values of 10° and 20°.

It is of interest to increase friction between ring elements U, V and sleeve M and, on the contrary, to reduce the frictions between cam portions K and ring elements U, V. The wedges and the shoes may for instance be hard prochromized or sulfinized. The ring elements may be provided with friction linings. Their surface of contact with the sleeve may be biconical, and so on.

In order to avoid the formation of an oil film between the ring elements and the sleeve, I may use bulging surfaces. Each ring element, for instance, may have a toroidal shaped friction face, or it may be of a radius slightly smaller than that of the inner surface of the sleeve.

I may also provide the ring elements with axial grooves which, extending crosswise to the circumferential grooves in the friction surface of the sleeve, divided the contact surface into a multiplicity of quadrilateral areas.

The cam portions, such as K are either flat or cylindrical and of revolution about axes such as $O_1$. Upon a wedge such as C, the adjacent ring elements U and V bear through their ends along bearing surfaces hereinafter designated by G and H, forming between them a mean angle γ, those bearing surfaces being of straight or circular profile.

Concerning now shoes S and T, they are in particular intended for the case where the two parts coupled together are slightly out of line with respect to each other. They permit all the bearing surfaces to be kept in full contact despite differences of position between the respective axes of the shaft and of the sleeve.

These self-adjustable shoes S, T are pivotable with respect to the wedge upon which they bear through surfaces of revolution.

As a rule, these surfaces are cylindrical but they may be made spherical to compensate not only for translatory displacements between the shaft axis and the sleeve axis, but also for angular relative displaceemnts. Angle γ is defined by the faces G. H of ring elements U and V upon which faces shoes S and T automatically adjust their position.

Of course these shoes, instead of being interposed at the place of surfaces G and H, may be provided at the place of surfaces H and K or G and K and the housings in which they are pivoted may be cut as well in the adjacent pieces U, V, A as in wedge C itself. These self orientable shoes have the supplementary advantage of making it possible to use flat bearing surfaces for cam portions K and for the bearing faces H and G of ring elements U and V, which may facilitate machining.

It will be noted that the chamfers X of the bearing surfaces in contact are systematically traced in such manner as to avoid the knife effect that may be exerted on a continuous surface by a piece bearing thereon with a sharp edge at the front.

Of course the invention is not limited to the particular embodiment above described. The number of the elements and wedges may be different from two. The respective functions of the shaft and the sleeve may be reversed, that is to say the cam portions may be cut in the sleeve, the sliding surface being then on the shaft. In a general manner, all the means above mentioned may be used for, in particular, increasing the limit sliding angle and reducing the tangential stresses and the radial pressures.

It should also be well understood that, within the scope of this invention, ring elements (U, V) have for their effect to produce an exponential increase of the friction torque as a function of the winding angular amplitude ω. But this amplitude is not limited to 180° as it is the case in the drawing, which relates to a construction including two ring elements of an amplitude nearly equal to 180°. As a matter of fact, it is possible to use ring elements made of several linked portions and exerting their effect upon a complete turn to several turns.

A mechanism according to the present invention may be combined with various control devices, of mechanical, hydraulic, magnetic, inertia and other kinds, in order to engage, disengage or reverse at will these free wheels.

According to the embodiment of FIG. 2, the effect of the centrifugal force is used to disengage the clutch when the speed of rotation exceeds a given value.

In this case also the coupling includes two ring elements U, V connected through two wedges C which, in this case, bear against a surface K of sleeve M. Each of these wedges bears through two branches $C_1$, $C_2$ respectively, upon the ends $H_1G_1$, of suitable shape, of ring elements U, V and it is subjected to the action of a spring E.

Advantageously and in a manner similar to that disclosed for FIG. 1, said ends G, H are arranged in the form of orientable shoes with respect to ring elements U. V. being for instance carried by pivots rotatable freely in said ring elements at the ends thereof. The flat faces of said shoes are slidable upon corresponding flat faces of branches $G_1H_1$ in the same manner as the shoes S, T of FIG 1, are bearing upon the corresponding faces G, H.

The sleeve M thus coupled with shaft A may rotate freely with respect thereto in the direction of arrow F, but it is prevented from rotating in the opposed direction.

If A is stationary, I thus obtain a device such that above a given speed of revolution of sleeve M in the direction that is permitted, the centrifugal force moves away from each other the portions of the ring of shaft A, despite the action of springs E which may be adjusted to a given value corresponding to this speed.

Ring elements U and V being then moved away from shaft A, the clutch offers no friction resistance to movement in the permitted direction and this property may be very advantageous, in particular for hydraulic converter reactors.

If A is a driving shaft and M a receiving sleeve, elimination of any friction is similarly obtained as soon as sleeve M, rotating at a higher speed than shaft A in the permitted direction, reaches the speed for which ring elements U, V are centrifugally moved away from each other. This is a new solution of the problem of coupling an engine to the driving shaft of its starter.

According to the embodiment of FIG. 3, transmission elements U, V are in the form of bars extending through shaft A, which has the advantage of multiplying the limit sliding torque, all other things being equal, by a factor $$\frac{1}{\sin. \delta/2}$$

consequently permitting higher values for angles α and γ. δ is the angle between the tangents at the ends of the transmission elements.

FIGS. 4 and 5 show still another embodiment of the invention, in which means are provided for reversing at will the driving direction.

Said means comprise wedges C provided with two bearing surfaces $L_1$, $L_2$ adpated to cooperate, at will, with either of two series of cam portions, of opposed direction, respectively, provided on shaft A.

In this embodiment, shaft A is provided at its periphery with a groove the edges of which are designated by N.

Two cam portions $K_1$ cooperating with said two wedges, are provided at 180° in said groove, whereas cam portions $K_2$, similarly disposed, are provided at the periphery of edges N. Wedges C have a T-shaped cross section, bearing surfaces $L_1$ forming projections engaged into the groove of shaft A so as to cooperate with cam portions $K_1$, whereas bearing surfaces $L_2$, disposed laterally, are adapted to cooperate with cam portions $K_2$.

It will be understood that a slight angular displacement of the whole of the wedges about the axis of shaft A causes said wedges to pass from one of these operating positions to the other one, these positions corresponding respectively to opposed driving directions.

Any suitable means may be provided for producing this displacement. In FIGS. 4 and 5, use has been made of a ring P freely rotatable about the axis of shaft A and adapted to receive an angular thrust in one direction or the other, said ring acting, for instance, through arms Q and intermediate springs R, upon pins W carried by the wedges. FIGS. 4 and 5 show the position for which the drive is obtained by the cooperation of surfaces $L_1$ with cam potions $K_1$. By moving ring P in direction $f$, the other driving position would be obtained, for which surfaces $L_2$ cooperate with cam portion $K_2$.

If shaft A is stationary, ring P is sufficient, being pushed in one direction or the other and being locked through any suitable means in either of its operating positions. If shaft A is a rotating shaft, suitable means are provided for moving said ring P in one direction or the other.

Besides it should be noted that, in neutral position, the clutch may be made inoperative, neither one nor the other of the bearing surfaces being in operative contact.

It should also be noted that the provision of a peripheral groove in shaft A permits of easily fitting ring elements U, V which penetrate into said groove.

A free wheel coupling according to the present invention has the following advantages:

It is simple and safe in operation, locking taking place without lag when the driving stress is to be transmitted whereas free wheel operations take place instantaneously without risk of wedging.

Furthermore this device can be manufactured without a particular tolerance and with a mounting which does not involve great requirements, in particular concerning concentricity or in line arrangement.

The device according to this invention permits of transmitting high torques without being voluminous and without involving excessive fatigues of the material since all the stresses to be transmitted are distributed over large areas.

The device permits of reversing the driving direction.

Finally it permits of reducing to zero any coupling friction beyond a given limit of speed in the direction that is permitted.

In a general manner, while there is disclosed in the above description what are deemed to be practical and efficient embodiments of the present invention, it should be well understood that the invention is not limited thereto as there might be changes made in the arrangement, disposition and form of the parts without departing from the principle of the invention as comprehended within the scope of the appended claims.

What I claim is:

1. For use between two coaxial members one of which is a rotating member, a one-way clutch for preventing relative rotation between said members in one direction while permitting free wheel rotation of said rotating member in the other direction, which comprises, in combination, two coaxial parts rigid with said two members respectively, to wit a first part and a second part, one of said parts being in the form of a shaft and the other said parts being in the form of a sleeve surrounding said shaft, the respective peripheries of said parts that face each other being of revolution and coaxial with each other, at least two transmission elements having respective walls in the form of surfaces of revolution and shaped to fit against the circular periphery of said first part, the second part being provided, in the circular periphery thereof that faces the first part with two cam portions oblique to said last mentioned circular periphery, wedges in contact along three contact surfaces respectively with said cam portions and said two elements in such manner that, when relative rotation tends to take place in said one direction, the combined actions of said cam portions pushing said wedges radially away from said second part and of said wedges applying said transmission elements against said first part causes clutch engagement, spring means bearing against said second part for urging said wedges in contact with said cam portions and pushing said elements constantly in contact with said first part, at least up to some speeds of rotation of said clutch, two self-orientable shoes for each wedge for making the contact respectively along two of said three contact surfaces, and cooperating abutments, respectively, on said second part and on said transmission elements for limiting the amplitude of the backward displacement of said transmission elements in case of high accelerations of the part running in free wheel relation, said abutments on said transmission elements being located towards the forward end of said transmission elements so that the abutments on said second part, when they cooperate with the abutments on said transmission elements, exert a pulling effect on said transmission elements.

2. A clutch according to claim 1 wherein said self-orientable shoes are carried by said wedges to cooperate with said transmission elements.

3. A clutch according to claim 1 wherein said self-orientable shoes are carried by said transmission elements to cooperate with said wedges.

4. A clutch according to claim 1 wherein said spring means are chosen to yield to the effect of the centrifugal force for speeds of rotation above a given value.

5. A clutch according to claim 1 wherein said transmission elements are bars extending transversely through said second part.

6. A clutch according to claim 1 wherein the angle of the cam portions with the circumference of the second part is slightly greater than the friction angle of said transmission elements with respect to the circular periphery of said first part, and the angle of said wedges is slightly greater than twice said friction angle.

7. A clutch according to claim 1 wherein, for a friction coefficient between said transmission elements and said circular periphery of said first part, the angle of the cam portions with the circumference of the second part is about 10° and the angle of said wedges is about 20°.

8. A clutch according to claim 1 wherein the part which carries the cam portions is provided with a peripheral groove at the bottom of which the cam portions are located, the transmission elements projecing into said groove.

9. A clutch according to claim 8 wherein two series of cam portions are provided, in combination with two series of bearing surfaces on the wedges, the clutch further comprising reversing means for causing effective operation of either one or the other of said two series, arranged in such manner as to permit the drive to take place in one direction or the other, respectively.

10. A clutch according to claim 9 wherein the two series of cam portions are provided respectively at the bottom of the groove and on the edges thereof, the wedges being provided with corresponding bearing surfaces.

11. A clutch according to claim 10 further comprising control means adapted shiftable in one direction or the other about the axis of the clutch to bring said wedges into one or the other of their operating positions.

References Cited

UNITED STATES PATENTS

| | | | |
|---|---|---|---|
| 880,117 | 2/1908 | Ball et al. | 192—41 X |
| 1,849,389 | 3/1932 | Tromanhauser | 192—41 |
| 1,932,053 | 10/1933 | Swartz | 192—41 X |
| 3,092,227 | 6/1963 | Dossier | 192—41 |

FOREIGN PATENTS

| | | |
|---|---|---|
| 499,608 | 1/1939 | Great Britain. |
| 652,184 | 10/1938 | France. |

BENJAMIN W. WYCHE III, *Primary Examiner.*

U.S. Cl. X.R.

188—82.8; 192—43, 93, 104